(12) United States Patent
Lange et al.

(10) Patent No.: US 11,645,545 B2
(45) Date of Patent: May 9, 2023

(54) TRAIN A DIGITAL ASSISTANT WITH EXPERT KNOWLEDGE

(71) Applicant: SAP SE, Walldorf (DE)

(72) Inventors: Stephan Lange, St. Leon-Rot (DE); Matthias Kaiser, Walldorf (DE)

(73) Assignee: SAP SE, Walldorf (DE)

( * ) Notice: Subject to any disclaimer, the term of this patent is extended or adjusted under 35 U.S.C. 154(b) by 1253 days.

(21) Appl. No.: 16/013,109

(22) Filed: Jun. 20, 2018

(65) Prior Publication Data

US 2019/0392325 A1    Dec. 26, 2019

(51) Int. Cl.
*G06N 5/02* (2006.01)
*G06F 40/30* (2020.01)

(52) U.S. Cl.
CPC ............. *G06N 5/02* (2013.01); *G06F 40/30* (2020.01)

(58) Field of Classification Search
CPC .................... G06N 5/02; G06F 40/30
See application file for complete search history.

(56) References Cited

U.S. PATENT DOCUMENTS

| | | | |
|---|---|---|---|
| 7,228,329 B2 | 6/2007 | Kaiser | |
| 7,310,625 B2 | 12/2007 | Wu | |
| 8,533,132 B2 | 9/2013 | Zimmerman et al. | |
| 2008/0154877 A1* | 6/2008 | Joshi | G06F 16/332 |
| 2013/0262504 A1 | 10/2013 | Allgaier | |
| 2014/0101079 A1 | 4/2014 | Deal | |
| 2014/0314225 A1 | 10/2014 | Riahi et al. | |
| 2017/0178145 A1 | 6/2017 | Adrian et al. | |
| 2019/0058793 A1* | 2/2019 | Konig | H04M 3/5183 |
| 2019/0243899 A1* | 8/2019 | Yi | H04M 3/527 |

FOREIGN PATENT DOCUMENTS

CN    106897067 A    6/2017

OTHER PUBLICATIONS

SAP Fiori Design Guidelines, printed Dec. 22, 2022 from the Internet at https://experience.sap.com/fiori-design-web/, 2 pages.
SAP Fiori | SAP Community, printed Dec. 22, 2022 from the Internet at https://community.sap.com/topics/fiori, 3 pages.
SAP Fiori | User Experience and Apps, printed Dec. 22, 2022 from the Internet at https://www.sap.com/products/technology-platform/fiori.html, 7 pages.
Waisgluss, A., "Talk with SAP CoPilot—The Digital Assistant for Enterprise," printed from the Internet at https://blogs.sap.com/2016/11/07/talk-with-sap-copilot-the-digital-assistant-for-enterprise/, 5 pages, Nov. 7, 2016.

* cited by examiner

*Primary Examiner* — Kevin W Figueroa
(74) *Attorney, Agent, or Firm* — Sterne, Kessler, Goldstein & Fox P.L.L.C.

(57) ABSTRACT

Disclosed herein are system, method, and computer program product embodiments for training a digital assistant with expert knowledge. An organization or individual utilizing a suite of software applications with a harmonized user experience may employ a digital assistant within the user experience to assist users when problems arise. The digital assistant may field questions and requests in informal and unstructured speech and text, analyze this natural language, and determine an appropriate response. The digital assistant may utilize existing suitable knowledge bases and leverage subject-matter experts. The digital assistant may learn from the expert's response to the user in order to apply the knowledge to a similar question or request in the future.

20 Claims, 4 Drawing Sheets

FIG. 2

My Available Budget

My Available Expense Budget

Chart by Fund
- Chart by Fund
- Chart by Fund/Budget Period
- Chart by Funds Center
- Table of Account Assignments Control Object Fund
General

-1.5K | -1K | -0.5K | 0 | 500 | 1K | 1.5K | 2K | 2.5K

-1.5K    990.00    2.5K

Available Amount (EUR) And Consumed Amount (EUR) And Consumable Amount (EUR)

Close

"I need information on negative budget"

Sure. Here are some sources of information that might help you with what you're looking for.

Information Sources
- How to do Budgeting at Best Run Inc.
- General guidelines on how to do budgeting in our...
- Prevent transfer or exceeded budget
- Disallow Negative Budgeting in FM-BCS using Check Libraries for Budget Address And here are the experts in this domain.

- Ben Brown — Subtitle information
- Eddie Marschal — Subtitle information
- Francine Joyner — Subtitle information Ask Leah Open In

TRAIN A DIGITAL ASSISTANT WITH EXPERT KNOWLEDGE

BACKGROUND

Generally speaking, an organization or individual may utilize a suite of software applications. The software applications may comprise client-server computer programs providing a wide-array of functionalities. The organization may develop and group the applications in a standardized user experience that is personalized, responsive, simplified, and optimized, providing users with a consistent platform to interact with the suite of software applications.

In some cases, the user experience may be improved by including a digital assistant operating among the software applications, i.e., a conversation-based flexible, extensible, dynamic, cross-device productivity tool. The digital assistant may analyze formal and unstructured speech to contextualize user commands and may leverage artificial intelligence, natural-language processing, machine learning, and ancillary knowledge bases to formulate and provide appropriate responses and actions. Such a digital assistant may be trained over time to more effectively process user requests and questions.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

FIG. 2 is an example screen display of an exemplary digital assistant embedded in a suite of client applications, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
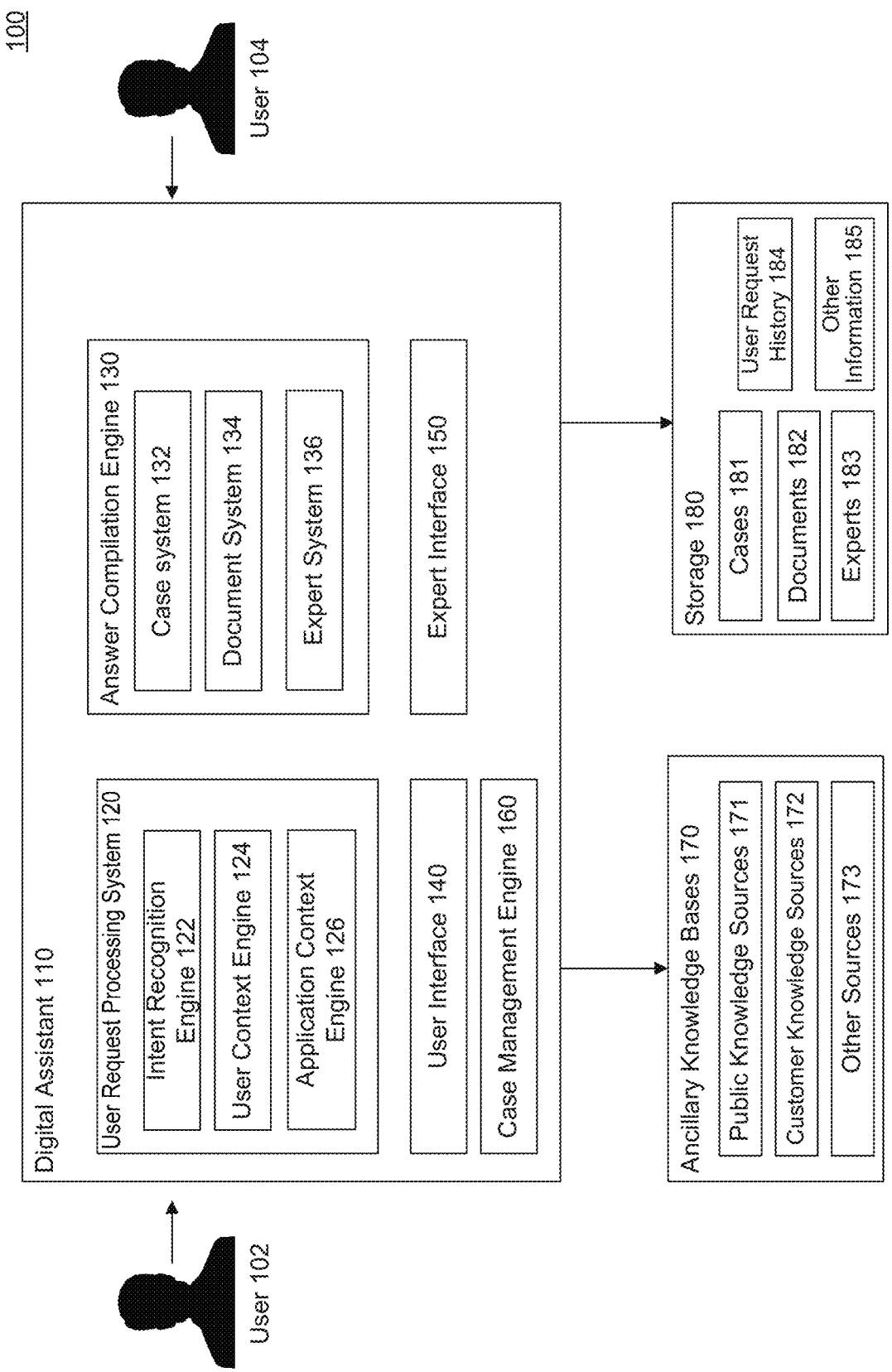
FIG. 1 illustrates an example user experience including a digital assistant and an expert, according to some embodiments.

Provided herein are system, apparatus, device, method and/or computer program product embodiments, and/or combinations and sub-combinations thereof, for training a digital assistant with expert knowledge.

An organization or individual may utilize a suite of software applications. The software applications may comprise client-server computer programs that provide a wide-array of functionalities. Such applications may include customer relationship management tools, enterprise resource planning tools, word processing applications, communication applications, product lifecycle management tools, supply chain management, general business solutions, and many other types of applications servicing a wide-array of industries. Individuals may also utilize the applications in the suite of software applications for entertainment, personal, financial, and many other purposes.

A user experience may harmonize user interactions with the suite of applications. The user experience may be personalized, responsive, simplified, and optimized, providing a consistent platform for users to interact with the suite of software applications. Such a user experience may employ a launchpad, i.e., a default page or home page that displays in a web browser or other interface. The launchpad may display a home page comprising tiles, wherein each tile represents a link or other manner of initializing an application in the suite of applications.

The user experience may be further improved by including a digital assistant in the launchpad to assist a user when problems arise. The digital assistant may further be initiated from within any application in the suite of applications. The digital assistant may resolve issues with applications in the suit of software applications, direct users to solutions regarding applications, solve navigational issues within the suite of applications, answer general questions, field inquiries involving external knowledge, address inquiries related to the organization's specific business processes, leverage cross-application data, and perform a multitude of other functions.

A user may converse with a digital assistant either verbally or textually. A user may ask questions, give commands, make requests, etc. A user's informal and unstructured speech and text may then be contextualized, analyzed, and compared to prior user interactions in order to present solutions, answers, and resources. A digital assistant may leverage or interface with applications in the suite of applications to automatically complete actions.

The effectiveness and efficiency of a digital assistant may be enhanced if the digital assistant can draw from fulsome information and resources. Accordingly, a digital assistant may access a panoply of suitable knowledge bases. Some knowledge bases may be stored internally within the digital assistant, and a digital assistant may further access external knowledge bases such as the Internet, encyclopedias, or other resources. A digital assistant may organize these varied knowledge bases using a number of methods, e.g., a case-based-reasoning methodology, wherein particular user intents are linked with appropriate cases, solutions, answers, actions, information, knowledge bases, etc.

In some situations, a digital assistant may determine that a subject-matter expert, i.e., a human being, may most effectively answer a user's question or otherwise resolve the situation. For example, the available knowledge bases may be insufficient to answer a user's question. In such a situation, a digital assistant may involve the subject-matter expert directly to address the users issue, present solutions, and remedy the situation. A digital assistant may learn from an expert's response and apply this learned knowledge to future similar cases in order to streamline user-interactions and curate a more expansive knowledge base to draw from when fielding user queries.

FIG. 1 illustrates a computing system representative of a user experience 100, according to some embodiments. User experience 100 may include user 102, expert 104, digital assistant 110, ancillary knowledge bases 170, and storage 180.

User 102 may be an individual or entity making use of a suite of software applications. User 102 may be a member of a business, organization, or other suitable group using software tailored for organizational functions. User 102 may be an individual using the software applications for personal pursuits. The software applications utilized by user 102 may be any suitable web-based application. User 102 may run the software applications or connect to the web-based applications using a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. User 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Expert 104 may be an individual or entity providing assistance to a user of a suite of software applications, such as user 102. Expert 104 may possess general expertise in the suite of software applications, expertise related to a specific application within the suite of software applications, expertise related to a business-process specific to an organization, or any other form of expertise that may be leveraged. Expert 104 may be an employee of the business or organization employing user experience 100 or otherwise associated with the organization. Expert 104 may interact with user 102 via text, e.g., a chat tool, via an audio/video connection, through a telephone, or through other suitable means. Expert 104 may interact with the user and/or appropriate interfaces using a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Digital assistant 110 may include user request processing system 120, answer compilation engine 130, user interface 140, expert interface 150, and case management engine 160. Digital assistant 110 may be accessed by user 102 from an application within a suite of software applications or initiated from a launchpad. User 102 may utilize digital assistant 110 to have questions answered, gather information, complete actions, get assistance, etc. Digital assistant 110 may operate in a suite of applications across various areas including: HR, finances, project management, business management, customer relationship management tools, enterprise resource planning tools, word processing applications, communication applications, product lifecycle management tools, supply chain management, general business solutions, and many other types of applications. Digital assistant 110 may be fed additional information from expert 104 when solving a problem from user 102, as described in further detail below with reference to FIG. 3.

In an embodiment, digital assistant 110 may be embedded in user experience 100 as a window, tab, frame, iframe, or other suitable element. Such an embodiment is described in further detail below with reference to FIG. 2. Digital assistant 110 may respond to text entered by user 102 in a conversational fashion. Digital assistant 110 may communicate with user 102 verbally. In an embodiment, digital assistant 110 may transmit data to user 102 and expert 104 via HTTP, formulated in accordance with hypertext transfer protocol W3C standards. Transmissions may also include images, stylesheets, client-side code, etc., the content and nature of which will be appreciated by those skilled in the relevant arts. Digital assistant 110 may specifically format responses for viewing on mobile devices in adherence with W3C mobile web best practices.

In another embodiment, digital assistant 110 may be an internet-of-things (IoT) device. In this embodiment, digital assistant 110 may be equipped with electronics, software, and network accessibility. In addition to the essential function(s) that digital assistant 110 performs, in this embodiment, digital assistant 110 may connect to the Internet or other network infrastructure in order to exchange data and provide ancillary functionality. In this embodiment, digital assistant 110 may be a devices such as: home appliances, thermostats, smart dishwashers, smart laundry machines, home security devices, smart light switches, etc. Digital assistant 110 may also be any physical device performing a primary function while also being embedded with electronics, software, and network connectivity enabling a connection to the Internet or network infrastructure.

User request processing system 120 may include intent recognition engine 122, user context analysis 124, and application context analysis 126. User request process system 120 may provide a mechanism by which digital assistant 110 interprets requests from user 102 utilizing available contextual information and natural language interpretation techniques.

Intent recognition engine 122 may be utilized by digital assistant 110 to determine an intent behind user-entered natural language. An intent may be thought of as the intention of the user who inputted the natural language. For example, a user writing "I would like to exit this application," may have an intention or intent of exiting the application from which digital assistant 110 was launched.

As described above, natural language received by user request processing system 120 may be textual or audio. For received audio, intent recognition engine 122 may preliminarily employ a speech-recognition engine or conversion methodology to translate the natural language into textual form for further analysis. Intent recognition engine 122 may analyze the natural language to determine a user intent or intent(s) using semantic parsing, latent semantic indexing/analysis, command and control approaches, semantic tagging, word distance functions, vector space models, or other natural language processing toolkits/methodologies. In an embodiment, intent recognition engine 122 may analyze acoustic speech patterns to ascertain further information regarding a user intent. In an embodiment, intent recognition engine 122 may employ language—or culture—structures to analyze natural language among and across different populations. Intent recognition engine 122 may employ other varied natural language processing techniques to derive an intent, as will be understood by one skilled in the art(s).

User context engine 124 may analyze information about user 102 to draw further conclusions about a user's intent. For example, user context engine 124 may examine or consider the software applications that user 102 generally works with, the role of user 102 with a company, application or access permissions, information provided to user 102 in the past, information stored in user request history 184, miscellaneous information about the user as stored in other information 185, or any other user-specific contextual information.

Application context engine 126 may analyze information about the application in the suite of applications from which user 102 initiated an interaction with digital assistant 110. Application context engine 126 may examine any actions that user 102 completed prior to querying digital assistant 110. For example, application context engine 126 may examine relevant system and application metadata, such as the title or sub-title of the application, semantic objects, information described in the app descriptor, version or component information, event logs, weblogs, etc. Application context engine 126 may analyze an application state to determine further contextual information. Just for example, if an application in current use by user 102 is suspended or hung, application context engine 126 could utilize this information to better contextualize a question from user 102. In this example, user request processing system 120 may determine that user 102 is currently experiencing a problem with that application.

Answer compilation engine 130 may include case system 132, document system 134, and expert system 136. Answer compilation engine 130 may return responses, information, links, and/or results to user 102 after compiling a result. In an embodiment, answer compilation engine 130 may complete appropriate actions within the suite of software applications based on the determined intent.

Case system 132 may be a module or engine utilized by answer compilation engine 130 to provide a response to user 102 in the form of a case. Case system 132 may formulate a response into a case, i.e., a mix of reusable knowledge items such as FAQ items, knowledge base articles, how-to-guides, and notes as well as actions or other programmable logic or modules that digital assistant 110 may undertake or execute. Case system 132 may relay a case to a user that includes links, images, text, follow-up questions, documents, or any other appropriate information to assist user 102.

Document system 134 may be a module or engine utilized by answer compilation engine 130 to provide a response to user 102 in the form of an document. Document system 134 may compile a copy of a document in ancillary knowledge bases 170 or stored in storage 180. In an embodiment, document system 134 may provide the document to the user automatically or provide a link to the document.

Expert system 136 may be a module or engine utilized by answer compilation engine 130 to provide a response to user 102 in the form of a recommended expert or experts. Expert system 136 may formulate a response that includes an expert or a group of experts for user 102 to connect with. Expert system 136 may allow a user to select a particular expert from the list. Expert system 136 may provide a link, chat window, telephone number or other suitable conversational method.

User interface 140 may provide a means by which user 102 may interact with digital assistant 110. User interface 140 may facilitate web traffic, SMS messaging, audio conversations, video connections, or any other suitable communication medium between user 102 and digital assistant 110. User 102 may interact with user interface 140 via text, i.e. a chat tool, an audio/video connection, through a telephone, or utilizing other suitable means. User interface 140 may be embedded within a suite of software applications as described in further detail below with reference to FIG. 2. In an alternate embodiment, user interface 140 may be launched independently of the suite of software applications. In another embodiment, user interface 140 may be embedded in an IoT device.

Expert interface 150 may provide a means by which expert 104 may interact with user 102, digital assistant 110, and any associated interfaces/systems. Such interaction may occur in a chat window, web page, messaging device, or via audio/video interfaces. Expert interface 150 may initiate a conversation upon determination of an appropriate expert, as described in further detail below with reference to FIG. 3. Expert 104 may interact with expert interface 150 via a mobile device in text, i.e. a chat tool, via an audio/video connection, through a telephone, or through other suitable means.

Case management engine 160 may provide a means by which expert 104 or other administrative staff updates cases, such as those stored in cases 181, and other information stored in digital assistant 110. Case management engine 160 may provide a suitable-web interface, process web-traffic or HTTP requests, and insert/update/delete/modify stored case information in case 181. Case management engine 160 may accept documents, text, or other data comprising to build appropriate cases. Case management engine 160 may associate these cases with particular user intents, organized hierarchically or in another suitable fashion.

Ancillary knowledge bases 170 may include public knowledge sources 171, customer knowledge sources 172, and other sources 173. Public knowledge sources 171 may include encyclopedias, publically available databases, Internet resources, and other publically available resources. Customer knowledge sources 172 may include various internally developed organizational resources such as help guides, user guides, documentation, etc. Other sources 173 may include various other suitable sources of knowledge.

Storage 180 may store cases 181, documents 182, experts 183, user request history 184, and other information 185. Cases 181 may be organized appropriately to include knowledge base articles, how-to-guides, notes, actions, etc. Documents 182 may store copies documents, e.g., help documents, documentation, etc., to be provided to users in certain situations. In an embodiment, documents 182 may store links to externally stored documents. Experts 183 may include a list of available experts, their areas of expertise, contact information, etc. User request history 184 may store information about a user's past interactions with digital assistant 110. Other information 185 may be any other suitable and relevant information stored for utilization by digital assistant 110.

FIG. 2 is an example screen display 200 of an exemplary digital assistant, such as digital assistant 110, embedded in a suite of client applications, according to some embodiments. Screen display 200 may include software application 202, digital assistant window 204, user query 206, response 208, sources 210, and experts panel 212. In this merely exemplary embodiment, software application 202 may be an application in the suite of applications or a launchpad for initiating applications in the suite of applications. Digital assistant window 204 may provide a means of interaction between digital assistant 110 and user 102, such as described above as user interface 140. In this embodiment, the interaction is text-based, but in other embodiments the interaction may be verbal, audio, visual, etc. In screen display 200, user query 206 reads: "I need information on negative budget." Digital assistant 110 analyzes the text (as described further below with reference to FIG. 3) and returns an appropriate response in response 208. Response 208 reads "Sure. Here are some sources of information that might help you with what you're looking for." In this embodiment, digital assistant 110 also provides sources 210 and experts panel 212. In other embodiments or examples, only one of sources 210 or experts panel 212 may be provided. In another embodiment, user 102 may be routed automatically to expert 104.

Figure 3:
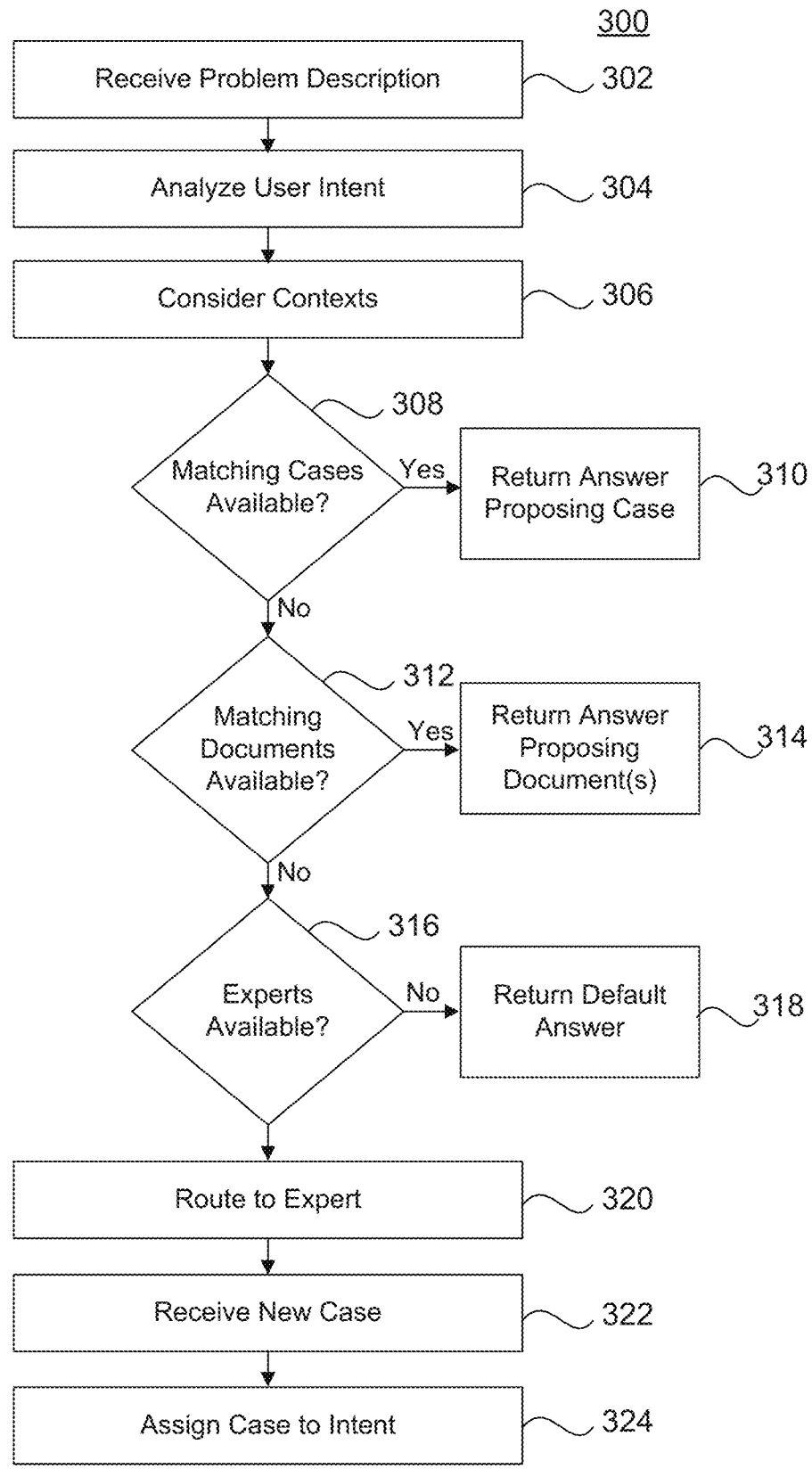
FIG. 3 is a flowchart illustrating a method of training a digital assistant with expert knowledge, according to some embodiments.

FIG. 3 illustrates a method 300 for training an exemplary digital assistant, such as digital assistant 110, with expert knowledge, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In an embodiment, method 300 is implemented according to the following example pseudocode:

```
Answer compileAnswerFromUserRequest (UserRequest userRequest) {
  Answer answer;
  Intent intent = calculateIntent(userRequest);
  UserContext userContext = retrieveUserContext(userRequest.user);
  ApplicationContext applicationContext = userRequest.applicationContext;
  Case[ ] cases = findMatchingCases(intent, userContext, applicationContext);
  if (cases[0].confidence > MINIMUM_CASE_CONFIDENCE) {
    // alternatively show more than one case if the respective
    // confidence level is higher than the threshold
    answer = createAnswerProposingCase(case[0]);
      }
  else {
    DocumentSearchResult documentSearchResults[ ] findMatchingDocuments(intent,
       userContext, applicationContext);
    if (documentSearchResults[0].confidence > MINIMUM_DOCUMENT_CONFIDENCE) {
      // alternatively show links to more than one document if the respective confidence
      // level is higher than the threshold
      answer = createAnswerProposingDocument(documentSearchResults[0];
    }
    else {
      ExpertSearchResult expertSearchResults[ ] findMatchingFirstLevelSupportExperts(intent,
         userContext, applicationContext);
      if (expertSearchResults[0].confidence > MINIMUM_EXPERT_CONFIDENCE) {
        // alternatively propose more than one document if the respective confidence
        // level is higher than the threshold
        answer = createAnswerProposingExpert(expertSearchResults[0]);
      }
      else {
        // default handling.
          // This can be a general answer where to find help or simply return the
        // best matching cases or documents.
        answer = createDefaultAnswer(userRequest, cases, documentSearchResults);
      }
    }
  }
  updateUserContext(userRequest.user, intent, applicationContext);
  updateUserRequestHistory(userRequest);
  return answer;
}
```

However, in other embodiments, method 300 can be implemented using other code/pseudocode/algorithms.

In 302, digital assistant 110 may receive a problem description from user 102 comprising natural language. Digital assistant 110 may utilize user request processing system 120 to receive and interpret text or vocalized natural language from user 102. The natural language may be a question, e.g., "What is . . . ," "How do I . . . ; a command, e.g. "Please retrieve . . . "; or any other suitable grammatical formulation of an intent by user 102. User 102 may ask business-process related questions, request specific actions to be completed, request resources, ask for general assistance, etc.

In 304, digital assistant 110 may analyze the intent behind the received natural language. Digital assistant 110 may employ intent recognition engine 122 to analyze the user's intent via machine learning methods including Naïve Bayes and SVM, deep learning, or another suitable approach. Intent recognition engine 122 may integrate and utilize semantic parsing, latent semantic indexing/analysis, command and control approaches, semantic tagging, word distance functions, vector space models, or other natural language processing toolkits/methodologies. Intent recognition engine 122 may store in storage 180 grammatical rules or other controls for comparison to the received natural language. Intent recognition engine 122 may update these grammars dynamically based on interactions with users. Intent recognition engine 122 may deploy latent semantic analysis to analyze the relationships between the words in the received natural language and previously received language.

In 306, digital assistant 110 may consider various contexts in which user 102 entered the problem description or natural language. Digital assistant 110 may employ user context engine 124 to analyze information about user 102. For example, user context engine 124 may examine or consider the tools that the user generally works with, the role of the user with a company, access permissions, geographical information about the user, miscellaneous user information, and any information provided to user 102 in the past, information stored in user request history 184, and/or any other information such as that stored in other information 185. Digital assistant 110 may employ application context engine 126 to examine relevant system and application metadata, such as the title or sub-title of the application, semantic objects, further information described in the application descriptor, version or component information, etc.

In 308, digital assistant 110 may determine if matching cases are available. Digital assistant 110 may employ answer compilation engine 130 to determine if a case exists in cases 181 that appropriately services the intent undergirding the natural language received from user 102. Such a case may include various reusable knowledge items such as FAQ items, knowledge base articles, how-to-guides, notes, expert write-ups, instructions, actions to automatically undertake within the suite of applications or via other APIs, programmable logic or modules, etc. Digital assistant 110 may rank the available cases using a percentage or number that provides relevancy indicator, i.e. the relevance of the case to the intent derived from the natural language. If there are matching cases available, method 300 proceeds to 310. If no matching cases are available, method 300 proceeds to 312.

In 310, digital assistant 110 may return the case determined in 308 to user 102. Digital assistant 110 may employ user interface 140 to route the information to user 102. User interface 140 may display links to the case and resources contained therein. User interface 140 may display a confirmation message if digital assistant 110 undertook particular actions or other suitable verification. User interface 140 may request permission from user 102 to complete some actions in the suite of software applications. In an embodiment, digital assistant 110 may return multiple cases within one answer. In such an embodiment, the cases may be arranged according to the relevancy indicators determined in 308. In an alternate embodiment, user interface 140 may provide audio tutorials or vocalize case information.

In 312, digital assistant 110 may determine if matching documents are available. Digital assistant 110 may determine if a document exists in ancillary knowledge bases 170 that provides an adequate response to the received natural language. Answer compilation engine 130 may examine public knowledge sources 171, e.g. encyclopedias, internet resources, customer knowledge sources 172, and other sources 173, including other suitable miscellaneous knowledge bases. Document system 134 may determine if any of these external sources in ancillary knowledge bases 170 provides an appropriate response to address the intent behind the received natural language. Digital assistant 110 may rank the resources using a percentage or a number to provide an indication of the relevance of the documents, i.e. a relevancy indicator. If there are matching documents available, method 300 proceeds to 314. If no matching cases are available, method 300 proceeds to 316.

In 314, digital assistant 110 may return the documents determined in 312 to user 102. Digital assistant 110 may employ user interface 140 to route the information to user 102. User interface 140 may display links to the documents. In an embodiment, multiple documents may be returned within one answer. In such an embodiment, the documents may be arranged according to the relevancy indicator(s) determined in 312.

In 316, digital assistant 110 may determine if experts are available to address the problem or question. Digital assistant 110 may employ expert system 136 to determine an appropriate expert or experts. Experts may be stored in experts 183 and organized in any suitable fashion. For example, an expert with familiarity with a particular software application may be determined when a user has an issue with that particular software application. In this embodiment, experts may be stored along with an association to appropriate software applications. Additionally, expert system 136 may retrieve contact information, demographic information, a picture or photograph, or other suitable information related to the determined expert. In one embodiment, digital assistant 110 may present a list of available experts to user 102 and subsequently receive a user-selected expert. If no expert is available, then method 300 proceeds to 318. If an expert is found, then method 300 proceeds to 320.

In 318, digital assistant 110 may return a default answer to user 102. The default answer may provide standard directions, direct user 102 to other resources, include a link to a home page, offer an apology or other suitable sentiments, etc.

Returning to 320, in the case where digital assistant 110 determined an expert in 316, digital assistant 110 may route user 102 to the determined expert. Expert interface 150 may provide a medium by which user 102 may communicate with expert 104, either through text, audio/video, or other suitable mechanism. Expert 104 may answer the question of user 102, provide guidance, complete super-user actions within an application, call upon other resources and knowledge sources, use human intelligence to determine a solution, route the user to another expert, etc. When the interaction between expert 104 and user 102 completes, expert 104 may determine if digital assistant 110 would benefit from the creation of a case to address the issue in the future. In such an instance, expert 104 may utilize case management engine 160 via expert interface 150 to create a new case.

In 322, digital assistant 110 may receive the new case from expert 104 as created after the interaction with user 102. Such a case may include information and content configured, created, and organized by expert 104. Expert 104 may utilize expert interface 150 to enter appropriate textual resources. Expert 104 may utilize document management interface 150 to update or add to ancillary knowledge bases 170. Expert 104 may include any appropriate FAQ items, knowledge base articles, how-to-guides, notes, actions, etc. Expert 104 may compose new documentation to address the resolved problem or question. Expert 104 may further include actions to conduct within the suite of applications, programmatically, via configuration tool, or otherwise. Expert 104 may also link the new case to the intent for the present matter. In an embodiment, expert 104 may simultaneously link the new case to other similar or related intents.

In 324, digital assistant 110 may employ case management engine 160 to associate the intent behind the processed natural language to the case for utilization when providing answers/solutions to users' intents in the future. Digital assistant 110 may associate the case to multiple such intents. Accordingly, as future interactions occur, digital assistant 110 may be more likely to have a case available in 308 to provide to user 102, without involving expert 104. Thus, over time, digital assistant 110 may have a more expansive knowledge base to draw from, and interactions between user 102 and digital assistant 110 may become more efficient and streamlined.

Figure 4:
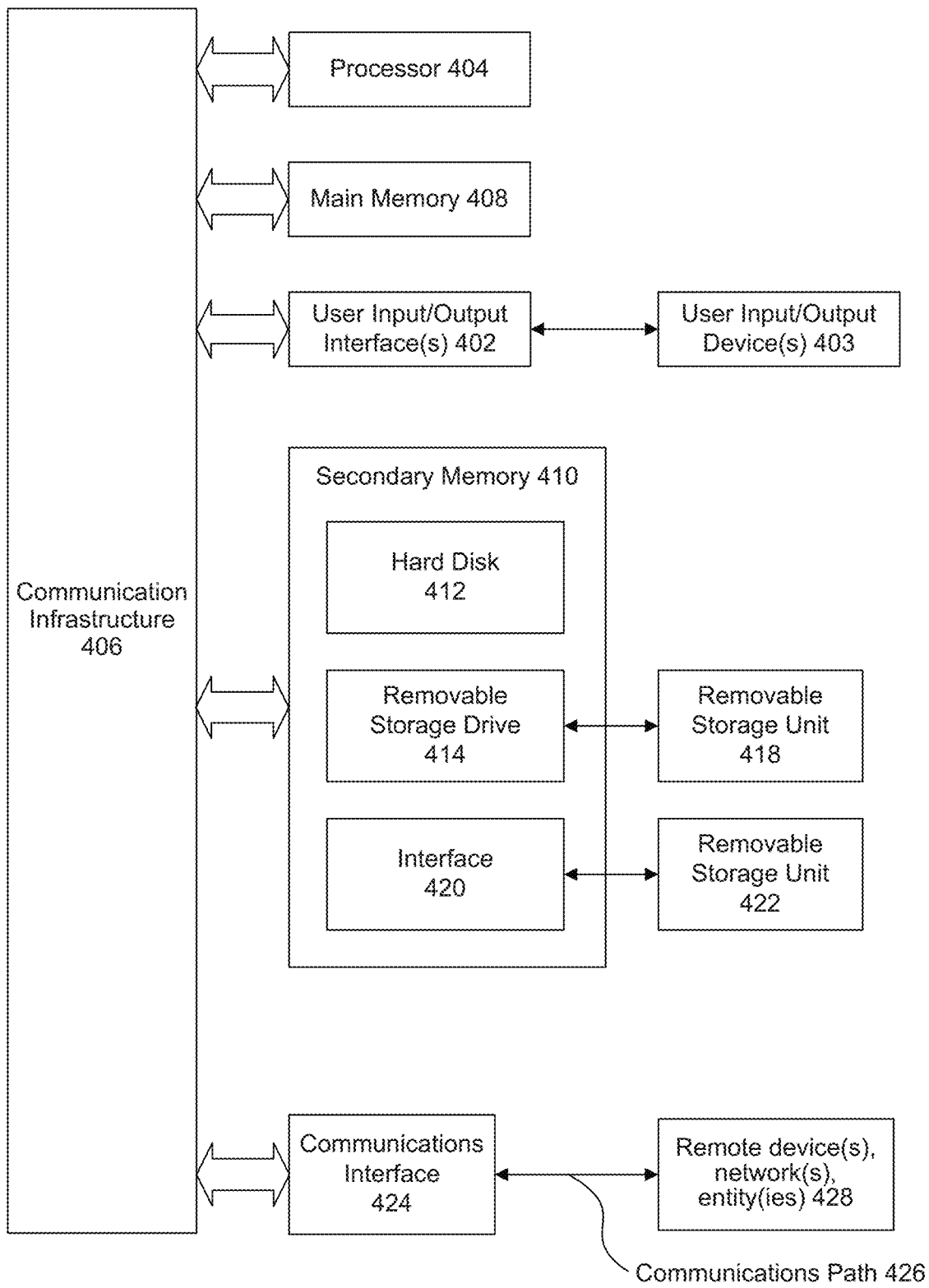
FIG. 4 is an example computer system useful for implementing various embodiments.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by a digital assistant, natural language from a user of a plurality of client applications;
   processing, by the digital assistant, the natural language to derive a determined intent; comparing, by the digital assistant, the determined intent to a plurality of cases, each case comprising a resource and a stored intent;
   when determining that the stored intent in the plurality of cases matches the determined intent, and responsive to the determining:
   determining, by the digital assistant, a plurality of resources based on the determined intent, wherein the plurality of resources include reusable knowledge items and actions to automatically undertake within the plurality of client applications;
   determining, by the digital assistant, a plurality of documents based on the determined intent;
   determining, by the digital assistant, a list of experts relevant to the determined intent;
   displaying, by the digital assistant, to the user the plurality of resources, the plurality of documents, and the list of experts relevant to the determined intent; and
   when determining that no stored intent in the plurality of cases matches the determined intent, and
   responsive to the determining: determining, by the digital assistant, an expert based on the determined intent; and
   routing, by the digital assistant, the user to the expert,
   wherein at least one of the receiving, processing, comparing, determining, displaying and routing are performed by one or more computers.

2. The method of claim 1, further comprising:
   receiving, by the digital assistant, a new case comprising a new resource from the expert; and
   adding, by the digital assistant, the new case to the plurality of cases,
   wherein the determined intent serves as the stored intent in the added case and the new resource serves as the resource in the added case.

3. The method of claim 1, further comprising:
   providing, by the digital assistant, the resource to the user if a case in the plurality of cases addresses the determined intent.

4. The method of claim 3, further comprising:
   providing, by the digital assistant, a second resource to the user if a second case in the plurality of cases addresses the determined intent; and
   ranking, by the digital assistant, the resource and the second resource using a relevancy indicator.

5. The method of claim 1, further comprising:
   considering, by the digital assistant, a user-context and an application-context in deriving the determined intent wherein the user-context comprises information about the user and the application-context comprises information about the plurality of client applications.

6. The method of claim 1, further comprising:
   determining, by the digital assistant, a second expert based on the determined intent;
   assigning, by the digital assistant, the expert and the second expert relevancy indicators;
   providing, by the digital assistant, the expert, the second expert, and the relevancy indicators to the user;
   receiving, by the digital assistant, a selected expert from the user from among the expert and the second expert; and
   routing, by the digital assistant, the user to the selected expert.

7. The method of claim 1, wherein a case in the plurality of cases further includes a programmatic action to conduct within an application in the plurality of client applications after processing the natural language to derive the determined intent.

8. The method of claim 1, wherein the digital assistant may be launched from an application within the plurality of client applications or a launchpad for the plurality of client applications.

9. A system, comprising:
   a memory;
   at least one processor coupled to the memory, the at least one processor configured to:
   receive natural language from a user of a plurality of client applications;
   process the natural language to derive a determined intent;
   compare the determined intent to a plurality of cases, each case comprising a resource and a stored intent;
   when determining that the stored intent in the plurality of cases matches the determined intent, and responsive to the determining:
   determining, by the digital assistant, a plurality of resources based on the determined intent, wherein the plurality of resources include reusable knowledge items and actions to automatically undertake within the plurality of client applications;
   determining, by the digital assistant, a plurality of documents based on the determined intent;
   determining, by the digital assistant, a list of experts relevant to the determined intent;
   displaying, by the digital assistant, to the user the plurality of resources, the plurality of documents, and the list of experts relevant to the determined intent; and
   when determining that no stored intent in the plurality of cases matches the determined intent, and based on the determination:
   determine an expert based on the determined intent; and
   route the user to the expert.

10. The system of claim 9, the at least one processor further configured to:
    receive a new case comprising a new resource from the expert; and
    add the new case to the plurality of cases,
    wherein the determined intent serves as the stored intent in the added case and the new resource serves as the resource in the added case.

11. The system of claim 9, the at least one processor further configured to:
    provide the resource to the user if a case in the plurality of cases addresses the determined intent.

12. The system of claim 9, the at least one processor further configured to:

consider a user-context and an application-context in deriving the determined intent wherein the user-context comprises information about the user and the application-context comprises information about the plurality of client applications.

13. The system of claim 12, the at least one processor further configured to:

provide a second resource to the user if a second case in the plurality of cases addresses the determined intent; and rank the resource and the second resource using a relevancy indicator.

14. The system of claim 9, the at least one processor further configured to:

determine a second expert based on the determined intent;

assign the expert and the second expert relevancy indicators;

provide the expert, the second expert, and the relevancy indicators to the user;

receive a selected expert from the user from among the expert and the second expert; and route the user to the selected expert.

15. The system of claim 9, wherein a case in the plurality of cases further includes a programmatic action to conduct within an application in the plurality of client applications after processing the natural language to derive the determined intent.

16. The system of claim 9, wherein the digital assistant may be launched from an application within the plurality of client applications or a launchpad for the plurality of client applications.

17. A non-transitory computer-readable device having instructions stored thereon that, when executed by at least one computing device, causes the at least one computing device to perform operations comprising:

receiving, by a digital assistant, natural language from a user of a plurality of client applications;

processing, by the digital assistant, the natural language to derive a determined intent;

comparing, by the digital assistant, the determined intent to a plurality of cases, each case comprising a resource and a stored intent;

when determining that the stored intent in the plurality of cases matches the determined intent, and responsive to the determining:

determining, by the digital assistant, a plurality of resources based on the determined intent, wherein the plurality of resources include reusable knowledge items and actions to automatically undertake within the plurality of client applications;

determining, by the digital assistant, a plurality of documents based on the determined intent;

determining, by the digital assistant, a list of experts relevant to the determined intent;

displaying, by the digital assistant, to the user the plurality of resources, the plurality of documents, and the list of experts relevant to the determined intent; and when determining that no stored intent in the plurality of cases matches the determined intent, and based on the determination:

determining, by the digital assistant, an expert based on the determined intent; and routing, by the digital assistant, the user to the expert.

18. The non-transitory computer-readable device of claim 17, the operations further comprising:

receiving, by the digital assistant, a new case comprising a new resource from the expert; and adding, by the digital assistant, the new case to the plurality of cases, wherein the determined intent serves as the stored intent in the added case and the new resource serves as the resource in the added case.

19. The non-transitory computer-readable device of claim 17, the operations further comprising:

providing, by the digital assistant, the resource to the user if a case in the plurality of cases addresses the determined intent.

20. The non-transitory computer-readable device of claim 17, the operations further comprising:

considering a user-context and an application-context in deriving the determined intent wherein the user-context comprises information about the user and the application-context comprises information about the plurality of client applications.

* * * * *